United States Patent
Bundy

[11] Patent Number: 5,997,227
[45] Date of Patent: Dec. 7, 1999

[54] BED RAIL MOUNT

[75] Inventor: Don Bundy, Sapulpa, Okla.

[73] Assignee: Mid America Automotive, Inc., Sapulpa, Okla.

[21] Appl. No.: 08/947,231

[22] Filed: Oct. 8, 1997

[51] Int. Cl.[6] ........................................ B06P 7/08
[52] U.S. Cl. ..................... 410/106; 410/101; 410/110; 410/116
[58] Field of Search ..................... 410/101, 106, 410/108, 110, 115, 116; 296/41, 43; 105/390; 248/499

[56] References Cited

U.S. PATENT DOCUMENTS

| | | | |
|---|---|---|---|
| 3,421,726 | 1/1969 | Getter | 410/110 |
| 3,623,690 | 11/1971 | Bargman, Jr. | 410/116 |
| 4,316,688 | 2/1982 | Roskelley | 410/116 X |
| 4,531,774 | 7/1985 | Whatley | 410/101 X |
| 4,604,013 | 8/1986 | Elwell et al. | 410/106 |
| 4,650,382 | 3/1987 | Johnson | 410/110 |
| 4,812,093 | 3/1989 | Millar, Jr. | 410/110 |
| 5,051,047 | 9/1991 | Loncasic | 410/110 X |
| 5,476,349 | 12/1995 | Okland | 410/106 |
| 5,618,140 | 4/1997 | Okland | 410/106 |
| 5,642,971 | 7/1997 | Ragsdale | 410/106 |
| 5,827,024 | 10/1998 | Davenport | 410/110 |

FOREIGN PATENT DOCUMENTS

| | | | |
|---|---|---|---|
| 313528 | 7/1919 | Germany | 248/499 |

Primary Examiner—Stephen T. Gordon
Attorney, Agent, or Firm—Molly D. McKay

[57] ABSTRACT

A bed rail mount for securing a cylindrical bed rail to stake holes on a bed of a pickup truck. The bed rail mount has a protruding snout that inserts into one end of a bed rail. The bed rail mount secures to the stake hole by way of a movable locking bracket that engages one side of the stake hole and a rearwardly sloped tongue provided on the bed rail mount that engages an opposite side of the stake hole. The locking bracket is engaged by a screw after the screw extends through a horizontal opening in the hollow body of the bed rail mount. Tightening the screw moves the locking bracket away from the tongue. The locking bracket is provided on two opposite sides with horizontally extending lips which lock under the stake holes of various types of pickups to secure the bed rail mount thereto.

4 Claims, 3 Drawing Sheets a
BED RAIL MOUNT

BACKGROUND OF THE INVENTION

1. Field of the Invention

The present invention relates to a unique mounting bracket for securing a bed rail to stake holes provided in the carrier sidewalls surrounding a bed of a pickup truck.

2. Description of the Related Art

Adding bed rails to the carrier sidewalls of a pickup bed has become quite popular with pickup truck owners. The added bed rails are both decorative and functional. One of the problems in designing a universal bed rail to fit any pickup truck is that different pickup truck manufacturers provide their pickups with stake holes of different dimensions.

One common means for attaching a bed rail to a pickup bed's carrier sidewalls is to employ a mounting bracket provided with an expandable gasket. The expandable gasket inserts in a stake hole and then the gasket is compressed to expand the gasket against the walls of the stake hole to thus hold the mounting bracket to the carrier sidewall. The expandable gasket works well when used on stake holes of constant dimensions, such as for example in use on only FORD® pickups. However, the same mounting bracket employing a compressible gasket will not secure to a DODGE® pickup, which has a slightly smaller stake hole than those found on FORD® products, nor will it secure to a CHEVROLET® pickup, which has still smaller stake holes than those provided on the DODGE® products.

The present invention solves this problem by providing a universal bed rail mount which can be used to secure a bed rail to a variety of sizes of stake holes.

An object of the invention is to provide a universal bed rail mount capable of fitting almost any pickup truck.

A further object of the invention is to provide a bed rail mount with a horizontal opening for a mounting screw which will not fill with rainwater and present a problem of the screw rusting over time.

A further object of the invention is to provide a functional and attractive bed rail mount.

A final object of the present invention is to provide a strong and economical bed rail mount.

SUMMARY OF THE INVENTION

The present invention is a bed rail mount for securing a bed rail to stake holes provided in carrier sidewalls of a bed of a pickup truck. Each bed rail mount is provided with a cylindrical extension which inserts inside an end of a cylindrical bed rail.

The bed rail mount is comprised of a bed rail mount body, a movable locking bracket and a threaded screw. The bed rail mount has a base which engages a top portion of the carrier sidewall when the bed rail mount is secured thereto.

The bed rail mount body is hollow and extends upward from the base in an arc configuration toward a first end of the bed rail mount, termination at the cylindrical extension, so that a longitudinal axis of the cylindrical extension lies above and parallel to a longitudinal axis of the base.

The base is provided with a horizontal opening extending through a wall of the base at the first end of the bed rail mount. The horizontal opening is larger in diameter at the first end and is provided with a shoulder internally at a point in the horizontal opening where the diameter of the horizontal opening decreases.

The screw inserts into the horizontal opening and a head, provided on a non-threaded end of the screw, engages the shoulder, preventing the screw from passing entirely through the horizontal opening. An opposite threaded end of the screw engages a threaded opening provided in an upward extension on the locking bracket, and when the screw is tightened, causes the locking bracket to move toward the first end of the bed rail mount.

A downwardly extending tongue is provided on the base adjacent a second end of the bed rail mount. A distal end of the tongue slants slightly toward the second end of the bed rail mount so that a proximal end of the tongue is slightly further from the second end than is the distal end.

The locking bracket is provided with a first end and an opposite second end. The locking bracket can be engaged by the screw so that the first end of the locking bracket faces the first end of the bed rail mount or, alternately, so the second end of the locking bracket faces the first end of the bed rail mount.

The first end of the locking bracket is provided with a proximal portion adjacent the base and a first lip adjacent the proximal portion and a second lip adjacent the first lip. When employed with one type of pickup, the stake hole engages the proximal portion when the screw is tightened, and the first lip extends under the stake hole to lock the bed rail mount thereto. Alternately, when employed with another type of pickup, the stake hole engages the first lip when the screw is tightened and the second lip extends under the stake hole to lock the bed rail mount thereto.

The second end of the locking bracket is also provided with a proximal portion provided adjacent the base and a single lip provided adjacent the proximal portion thereof. When employed with still another type of pickup, the stake hole engages the proximal portion of the second end and the single lip extends under the stake hole to lock the bed rail mount thereto.

DETAILED DESCRIPTION OF THE PREFERRED EMBODIMENT INVENTION

Figure 1:
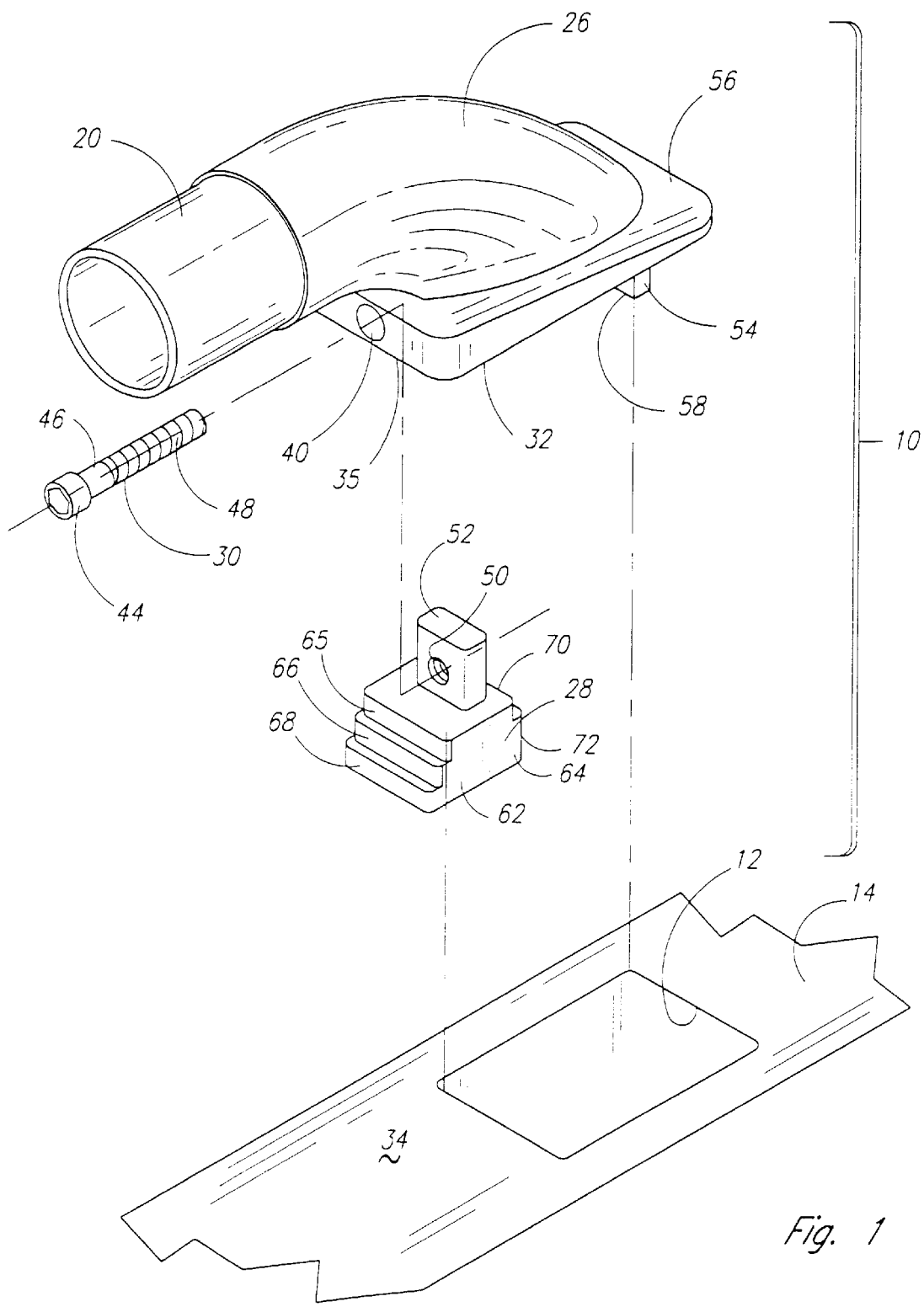
FIG. 1 is an exploded perspective view of a bed rail mount constructed in accordance with a preferred embodiment of the present invention.

Referring now to the drawings, and initially to FIGS. 1 through 4, there is illustrated a bed rail mount 10 constructed in accordance with a preferred embodiment of the present invention. The bed rail mount 10 secures to a stake hole 12 provided in a carrier sidewall 14 surrounding a bed 16 of a pickup truck 18.

The bed rail mount 10 is used in pairs of two bed rail mounts 10, with one pair of bed rail mounts 10 employed on each of two carrier sidewalls 14 on a pickup truck 18. To use the bed rail mounts 10, a horizontally extending cylindrical extension 20 provided on each of the two bed rail mounts 10 inserts one into each of opposite ends 22 of a cylindrical rod or bed rail 24, so that each of the cylindrical extensions 20 is a male portion inserting, in mating fashion, into a female opening on the ends 22 of the bed rail 24.

Once the cylindrical extensions 20 on a pair of bed rail mounts 10 are inserted into the opposite ends 22 of a bed rail 24, the bed rail mounts 10 are then secured to front and rear stake holes 12 provided on one carrier sidewall 14 of the bed 16 of the pickup truck 18.

Once the bed rail mounts 10 are secured in the stake holes 12, the bed rail 24 is captured between its associated pair of bed rail mounts 10.

The present invention is a unique type of universal bed rail mount 10 which will fit a variety of different brands of pickup trucks 18, including, but not limited to, FORD®, CHEVROLET®, and DODGE® brands of pickup trucks 18.

Figure 2:
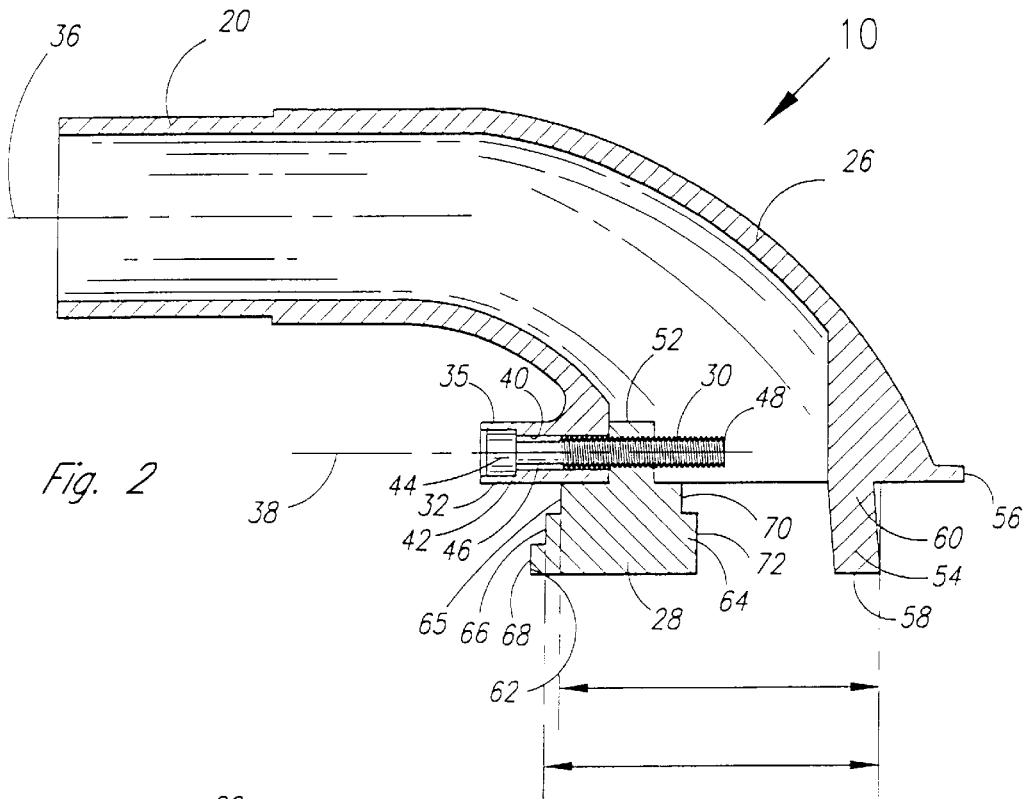
FIG. 2 is a cut away side view of the bed rail mount of FIG. 1.

Referring now to FIG. 1, the bed rail mount 10 is comprised of a hollow bed rail mount body 26, a movable locking bracket 28 and a threaded screw 30. The cylindrical extension 20 is provided on the bed rail mount body 26. The bed rail mount body 26 is provided with a base 32 which engages a top portion 34 of the carrier sidewall 14 when the bed rail mount 10 is secured in the stake hole 12. The bed rail mount body 26 extends upward from the base 32 in an arc configuration on a first end 35 on the bed rail mount 10 so that the bed rail mount body 26 terminates distal from the base 32 in the cylindrical extension 20 and the cylindrical extension 20 has a longitudinal axis 36 which lies above and parallel to a longitudinal axis 38 of the base 32, as illustrated in FIG. 2.

The base 32 is provided with a horizontal opening 40 which extends through the base 32 at the first end 35 of the bed rail mount 10.

Figure 3:
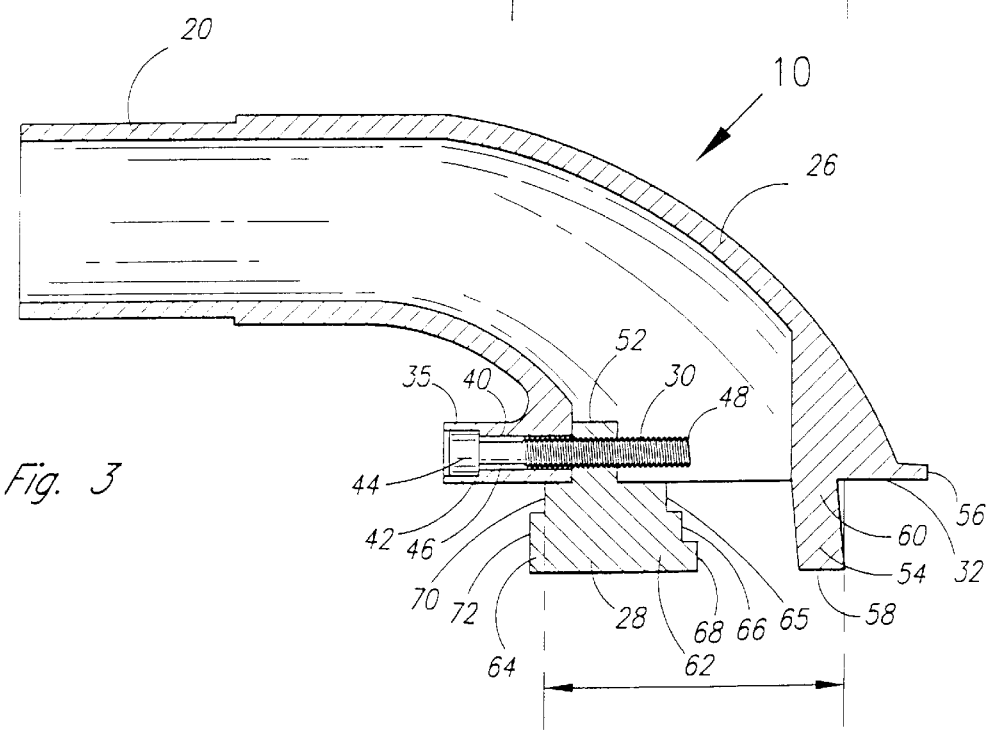
FIG. 3 is a cut away side view of the bed rail mount of FIG. 1, showing an alternate orientation for the movable locking bracket.
Figure 4:
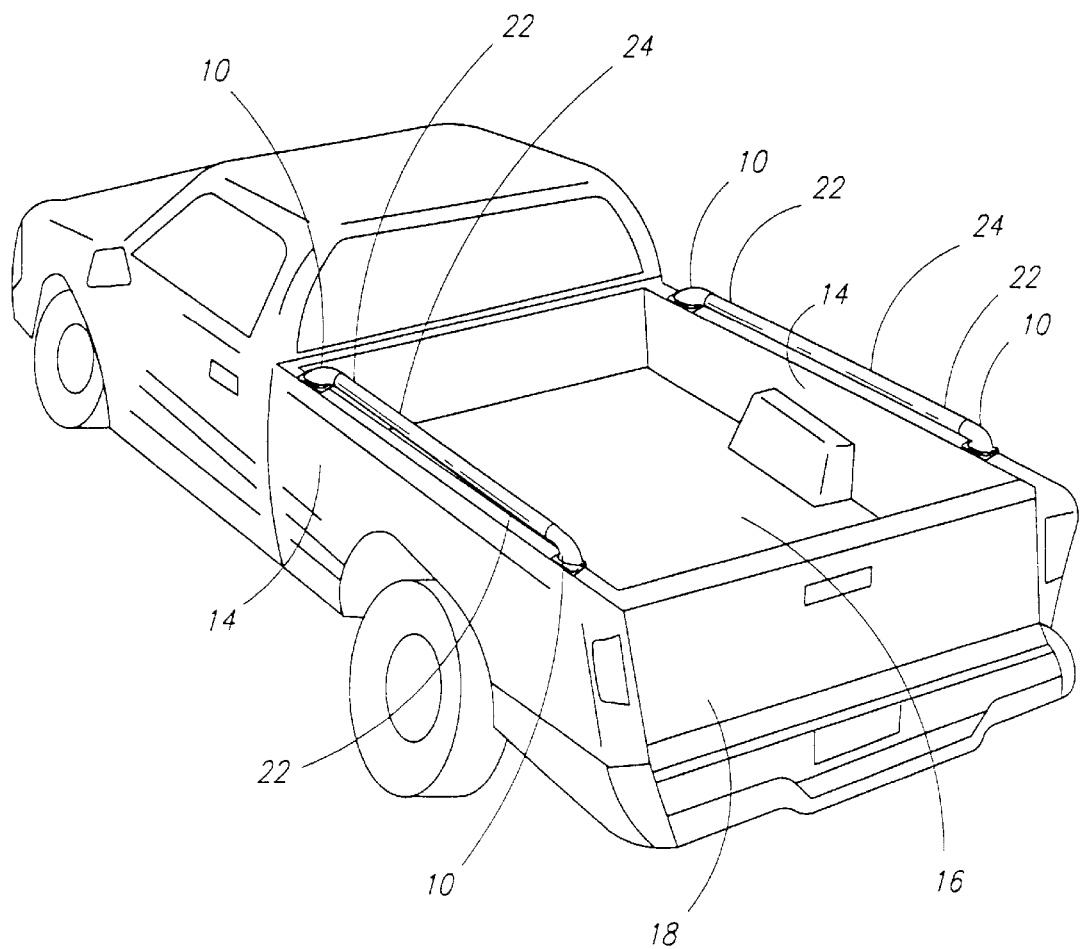
FIG. 4 is a perspective view of a pickup truck on which the bed rail mounts of the present invention are employed.

The horizontal opening 40 is larger in diameter adjacent the first end 35 and is provided with a recessed shoulder 42 internally where the horizontal opening 40 decreases in diameter. The threaded screw 30 inserts through the horizontal opening 40, as illustrated in FIG. 2 and 3, and is prevented from passing completely therethrough by the shoulder 42. As the screw 30 enters the horizontal opening 40, a head 44 provided on a non-threaded end 46 of the screw 30 encounters the shoulder 42, thus preventing the screw 30 from moving further inward within the horizontal opening 40.

The opposite threaded end 48 of the screw 30 enters the hollow center of the bed rail mount body 26 where it engages a threaded opening 50 provided in an upward extension 52 of the locking bracket 28.

In order to secure the bed rail mount 10 within the stake hole 12, the screw 30 is loosened so that a downwardly extending tongue 54 that is provided on the base 32 on an opposite second end 56 of the bed rail mount 10 and also the locking bracket 28 can both enter the stake hole 12, allowing the base 32 to rest on the top portion 34 of the carrier sidewall. Then the screw 30 is tightened, causing the screw head 44 to engage the shoulder 42 and causing the locking bracket 28 to move toward the first end 35 of the bed rail mount 10. As the screw 30 is further tightened, the tongue 54 engages one side of the stake hole 12 and a side of the movable locking bracket 28 opposite the tongue 54 engages an opposite side of the stake hole 12, thus securing the bed rail mount 10 to the stake hole 12.

The tongue 54 extends downward from the base 32 slightly off perpendicular from the base 32 so that a distal end 58 if the tongue 54 extends slightly further toward the second end 56 than does a proximal end 60 of the tongue 54. Thus, the tongue 54, which extends downward from the base 32 and slightly leans toward the second end 56, is able to wedge against the stake hole 12 when the screw 30 is tightened and makes removal of the tongue 54 from the stake hole 12 impossible until the screw 30 is loosened.

The movable locking bracket 28 is provided with a first end 62 and an opposite second end 64 so that either the first end 62 or the second end 64 engages the stake hole 12 when the screw 30 is tightened, depending on whether the first end 62 or the second end 64 of the locking bracket 28 faces the first end 35 of the bed rail mount 10 when the screw 30 engages the threaded opening 50, as illustrated respectively in FIG. 2 and in FIG. 3.

The first end 62 is provided with a proximal portion 65 which engages the stake hole 12 when the screw 30 is tightened for a DODGE® pickup 18, or at least those DODGE® pickups 18 of model years 1994 and newer. In order for the proximal portion 65 to engage the stake hole 12, the locking bracket 28 must be oriented as shown in FIGS. 1 and 2, with the first end 62 of the bracket 28 facing toward the first end 35 of the bed rail mount 10 and the second end 62 of the bracket 28 facing toward the second end 56 of the bed rail mount 10. The first end 62 of the locking bracket 28 is provided with a first lip 66 adjacent to the proximal portion 65 and extending outward therefrom. The first lip 66 extends under the stake hole 12 of the DODGE® pickup 18 to lock the bed rail mount 10 to the carrier sidewall 14 and to prevent the bed rail mount 10 from being removed from the stake hole 12 until the screw 30 is loosened.

The first end 62 of the locking bracket 28 is also provided with a second lip 68 adjacent to the first lip 66 and extending outward therefrom. When the bed rail mount 10 is employed on a FORD® pickup 18, or at least on model years 1997 and newer FORD® products, the first lip 66 engages the stake hole 12 when the screw 30 is tightened and the second lip 68 extends under the stake hole 12 to lock the bed rail mount 10 to the carrier sidewall 14 and to prevent the bed rail mount 10 from being removed from the stake hole 12 until the screw 30 is loosened.

The second end 64 is also provided with a proximal portion 70 which engages the stake hole 12 when the screw 30 is tightened for a CHEVROLET® pickup 18, or at least those CHEVROLET® pickups 18 of model years 1988 and newer. In order for the proximal portion 70 to engage the stake hole 12, the locking bracket 28 must be oriented as shown in FIG. 3, with the first end 62 of the bracket 28 facing toward the second end 56 of the bed rail mount 10 and the second end 64 of the bracket 28 facing toward the first end 35 of the bed rail mount 10. The second end 64 of the locking bracket 28 is provided with a single lip 72 adjacent to the proximal portion 70 and extending outward therefrom. The single lip 72 extends under the stake hole 12 of the CHEVROLET® pickup 18 to lock the bed rail mount 10 to the carrier sidewall 14 and to prevent the bed rail mount 10 from being removed from the stake hole 12 until the screw 30 is loosened.

It is obvious from the foregoing description that the movable locking bracket 28 may be provided with proximal portions 65 and 70 and with lips 66, 68 and 72 of varying depths or thicknesses in order that they will accommodate different sizes of stakes holes 12 that currently may be found on pickup trucks 18 or to accommodate sizes of stakes holes 12 that may be provided on future models of pickup trucks 18.

Also the screw 30 is preferably an allen head type screw for ease in tightening and loosening it.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A bed rail mount for securing a bed rail to stake holes on a pickup truck comprising
   - a bed rail mount body with a horizontal protruding portion that engages a bed rail,
   - a tongue that extends downward from one end of said bed rail mount body and that removably inserts into a stake hole,
   - a locking bracket that movably attaches to an opposite end of said bed rail mount body and that removably inserts into said stake hole,
   - a horizontally oriented screw for reversibly moving said locking bracket away from said tongue within said stake hole,
   - a wall of said bed rail mount body being provided with a horizontal opening, said horizontal opening provided with a shoulder located adjacent an external portion of the opening,
   - said screw removably insertable in said horizontal opening, a head on said screw engaging said shoulder to prevent said screw from passing completely through said horizontal opening,
   - said locking bracket being provided with a threaded opening, a threaded end of said screw engagable with said threaded opening in order to reversibly move said locking bracket away from said tongue.

2. A bed rail mount for securing a bed rail to stake holes on a pickup truck comprising:
   - a bed rail mount body with a horizontal protruding portion that engages a bed rail,
   - a tongue that extends downward from one end of said bed rail mount body and that removably inserts into a stake hole,
   - a locking bracket that movably attaches to an opposite end of said bed rail mount body and that removably inserts into said stake hole,
   - a horizontally oriented screw for reversibly moving said locking bracket away from said tongue within said stake hole, and
   - a distal end of said tongue slanting away from said locking bracket.

3. A bed rail mount for securing a bed rail to stake holes on a pickup truck comprising:
   - a bed rail mount body with a horizontal protruding portion that engages a bed rail,
   - a tongue that extends downward from one end of said bed rail mount body and that removably inserts into a stake hole,
   - a locking bracket that movably attaches to an opposite end of said bed rail mount body and that removably inserts into said stake hole,
   - a horizontally oriented screw for reversibly moving said locking bracket away from said tongue within said stake hole,
   - a first side of said locking bracket being provided with a proximal portion adjacent said bed rail mount body,
   - a first horizontal lip provided on said first side adjacent said proximal portion and extending outward therefrom, and
   - a second horizontal lip provided on said first side adjacent said first horizontal lip and extending outward therefrom.

4. A bed rail mount according to claim 3 wherein said locking bracket further comprises
   - an opposite second side of said locking bracket also being provided with a proximal portion adjacent said bed rail mount body, and
   - a first horizontal lip provided on said second side adjacent said proximal portion of said second side and extending outward therefrom.

* * * * *